Patented Nov. 7, 1950

2,528,875

UNITED STATES PATENT OFFICE 2,528,875

PROCESS FOR MAKING RAW WATER ICE

Arthur Charles Embshoff, Western Springs, Ill., assignor to Infilco Incorporated, Chicago, Ill., a corporation of Delaware No Drawing. Application July 16, 1949,
Serial No. 105,260

11 Claims. (Cl. 62—172)

This invention relates to the manufacture of ice and more particularly to the manufacture of ice from raw water and is a continuation in part of my copending application Serial No. 30,980, now abandoned.

It is an object of this invention to provide an economical and effective process for making clear raw water ice which is resistant to cracking.

Another object of my invention is to provide a process for manufacturing raw water ice at a lower temperature than has generally heretofore been considered practical.

A further object of my invention is to provide a process of preparing raw water containing metal salts in solution for freezing under quiescent conditions to obtain a clear ice that is resistant to cracking.

A still further object of my invention is to provide a novel and efficient process for the manufacture of clear ice from raw water without employing the usual air agitation.

A further object is to provide a new process for the manufacture of clear ice from raw water without core pulling.

These and other objects will become apparent from the description and claims which follow.

To make clean, clear ice from raw water it is necessary that the water be free of foreign substances in suspension and in solution which will discolor the ice and cause deposits to form therein. It is also imperative that means be provided to prevent air or gas bubbles liberated from solution by the freezing process from freezing into the ice, which will make it cloudy and opaque.

It has, therefore, been usual to first treat the water with lime or a coagulant, or both, to minimize the content of carbonates of calcium and magnesium, iron and silica and to remove suspended solids such as organic matter, color and the like. The lime treated water has sometimes been neutralized with aluminum sulfate to convert to sulfates the small quantities of carbonates of calcium and magnesium left in the water after lime treatment. The treated water is usually filtered, sometimes cooled, and then delivered to a can filler for filling the cans in which it is frozen. During freezing it is necessary to continuously agitate the contents of the cans by blowing air through the water to sweep away from the forming ice film dissolved gases and any solids which would otherwise be occluded in the ice cake and render it opaque. The air used for the agitation must be cool, dry and clean as otherwise taste, odor and color may be imparted by it to the final product. It is therefore usual to subject the air coming from the air compressors or blowers to several treating steps, such as oil separation, washing, cooling and dehumidifying before using it for the agitation of the water during the freezing process. Each of these steps requires equipment which is expensive both in first cost and in operation.

The usual minimum freezing temperature for raw water ice is 10° F., but ordinarily higher temperatures are maintained, as at lower temperatures the ice checks and cracks, either in the freezing tank, or when the cans are withdrawn, or both. Obviously the output of ice making apparatus of a given size depends largely on the temperature at which freezing takes place and will be materially reduced as the brine temperature is raised to overcome cracking difficulties.

In spite of all these precautions necessary to provide a clean, clear ice without serious cracking problems, certain difficulties still remain and the ice produced is frequently of unsatisfactory quality. This is due to a large extent to the fact that the lime treatment of the raw water and the subsequent neutralization of the lime treated water does not completely remove all deposit forming substances, nor does it remove the sulfates and chlorides from the water. As the freezing process proceeds, these impurities concentrate in the core water. The deposit forming substances form a precipitate in the core water and the sulfates and chlorides retard its freezing. It has therefore usually been necessary to "pull cores," i. e. to remove the core water containing these concentrated impurities and replace it with fresh water in order to produce a product of desired quality.

My new process of manufacturing raw water ice is simpler and, in general, more economical than the conventional methods described, permits freezing at lower temperatures, and still results in sparkling clear ice, resistant to cracking. My process is based on the recognition that most of the troubles in conventional raw water ice manufacture, which necessitate the cumbersome treatment steps described, are due to the presence, during freezing, of dissolved solids and of dissolved gases in the raw water which were not removed by the pretreating methods heretofore employed. I have discovered that by removing these impurities prior to freezing, and by providing a demineralized and degasified water for freezing, I can eliminate the expensive air agitation and the usual "core pulling" and am able to freeze at lower temperatures and still obtain clear, non-cracking ice. My invention, therefore, is particularly concerned with removing practically all dissolved solids from the raw water, and also removing air and gases therefrom prior to freezing. This is done according to the invention by subjecting the raw water either directly, or after conventional pretreatment to remove precipitatable impurities, to ion exchange treatment and degasification.

A further essential of my process is to deliver the mineral and gas free water into the freezing cans without entraining air. Obviously, the advantages obtained by degasifying the water would be lost if the water were permitted to pick up air thereafter.

The ion exchange treatment is carried out in a manner well known in the art. The water is contacted in a first step with a material capable of exchanging hydrogen for the metal ions. In this manner the metal salts in solution, such as calcium, magnesium and sodium bicarbonates, sulfates or chlorides are converted to the corresponding free acids, such as carbonic, sulfuric and hydrochloric acid. Any cation exchange material operating on the hydrogen exchange cycle, such as carbonaceous or resinous materials of this type, can be used for this first step.

The water leaving the cation exchange step is contacted with an anion exchange, or acid removal, material to remove the free acids formed in the first step. Any of the many known acid removal materials may be used in this second exchange step. However, usually I prefer to use a highly basic anion exchange material because of the ability of material of this type to remove free carbon dioxide and silica from the water treated by hydrogen exchange as well as the mineral acids. (The properties and behavior of one highly basic anion exchange resin have been described by Kunin and McGarvey in Industrial and Engineering Chemistry, June, 1949.) Any silica in the water that has not been previously precipitated by lime treatment and filtered out, must be removed prior to freezing to prevent its depositing in the core. Further, to minimize the cost of degasifying the water almost completely, it is essential that the water to be degasified contain the minimum of free carbon dioxide. For while dissolved oxygen in the water can be reduced to sufficiently low limits without difficulty, it has been found difficult and uneconomical to reduce carbon dioxide to very low limits by degasifying means, such as vacuum deaeration.

In the practice of the new process it will frequently be found desirable to use the conventional pretreatment by lime, coagulants or both to eliminate all contaminating substances that can be removed thereby, such as carbonates of calcium and magnesium, suspended solids, iron, silica and the like. While these impurities can be removed along with the chlorides and sulfates in the demineralization step of the process, it is usually cheaper to purify the water as far as possible by lime treatment and coagulation prior to ion exchange, particularly where such pretreatment facilities are already installed. Ion exchange materials function most effectively and economically when supplied with clean, clear water. Consequently, if the water to be treated contains appreciable turbidity, suspended matter and color, pretreatment by coagulation is indicated. Removal of relatively large amounts of carbonate hardness in the raw water by lime treatment is less costly than their removal by ion exchange. Many ice plants are already equipped for treatment of the raw water with lime and coagulants, and can utilize a smaller and less costly ion exchange plant by pretreating the raw water in the usual manner and then demineralizing a water that contains besides the sulfates and chlorides only small amounts of calcium carbonate, magnesium hydroxide and silica.

When the raw water contains only relatively small amounts of turbidity and its alkalinity is low, such as 20 to 25 p. p. m. or less, direct demineralization (without pretreatment with lime or coagulants) followed by vacuum deaeration will provide a satisfactory water at reasonable cost. When a clean water of higher alkalinity, say 50 p. p. m. or more, is directly demineralized, it will be found desirable to remove carbon dioxide from the effluent of the cation exchanger by forced draft aeration prior to its treatment on the anion exchanger. Thereafter, the effluent of the anion exchanger can be readily deaerated by vacuum deaeration. This latter form of the process, wherein a highly alkaline raw water is subjected to direct demineralization, is less desirable because the air introduced into the water in the forced draft aeration step is a potential source of contamination of the water. While such air is removed in the following vacuum degasification, any contaminating matter introduced by the air remains in the water and contaminates the ice.

The water leaving the ion exchange treatment is practically free from all dissolved solids and if a highly basic anion exchange material has been used, also free from silica and carbon dioxide, but it still contains oxygen and other gases which must be removed to prevent their freezing into the ice and making it opaque. For this reason, in a further step of my process the water is subjected to degasification without heating to produce a substantially gas free water. The preferred manner of degasification is vacuum deaeration which will readily remove substantially all dissolved gases from the water.

The sequence of treating steps can also be reversed and the water be deaerated prior to its demineralization. This necessitates using closed shell ion exchange filters which prevent pick-up of air during the demineralization step. Such reversal of the sequence of the treating steps may sometimes be desirable. Ordinarily, however, it is preferable that the deaeration step immediately precede freezing.

After the water has been properly deaerated it is ready to be put into ice cans for freezing. During the operation of filling the cans, however, great care must be taken to avoid re-entrainment of air by the water. In the conventional can filling arrangements no provision is made for preventing air pick-up, the water being permitted to splash from the supply tank into the freezing cans. This is permissible in the conventional process of manufacturing raw water ice where the water is subjected to air agitation during freezing. However, in my process, where freezing takes place under quiescent conditions and air agitation is eliminated, it is imperative that the water in the freezing cans be practically air and gas free. Air entrainment during filling of the supply tank and of the cans must, therefore, be minimized or eliminated. Many ways to obtain this result will suggest themselves to those skilled in the art, one way being to run the degasified water into the freezing cans from the bottom rather than allow the water to splash into the cans. The particular means of preventing pick-up of air during filling of the ice cans forms no part of this invention which is concerned only with the process of raw water ice manufacture.

The demineralized and dissolved gas free water in the cans is then frozen under quiescent conditions and at temperatures within the range of from about 6° F. to about 9° F., or higher if circumstances make a higher temperature desirable, and will produce clean, clear ice that is resistant to checking and cracking.

It will be apparent from the foregoing that I have provided a new and useful process of making raw water ice which is simpler and more economical than methods heretofore employed, and which results in a better ice. While I am aware that individual steps of my process are old and have been used in treating water for various purposes, I make no claim to any one of these individual steps per se. I believe, however, that they have not heretofore been combined with other steps of the process in the manner and for the purpose and with the results disclosed herein, and that I have made a substantial contribution to the art. I have departed substantially from the teaching of the old art of raw water ice manufacture by eliminating the silica, the chlorides and sulfates, as well as the gases from the raw water before freezing, and by freezing under quiescent conditions and without removing or adding water during the freezing process rather than with the expensive air agitation and core pulling.

Many modifications of the process disclosed for purposes of exemplification coming within the scope and spirit of my invention will be suggested to those skilled in the art. Accordingly, I do not wish to limit myself to the exact combination or sequence of treating steps described for purposes of illustration, but only to the essence of the process which resides in the elimination of minerals and gases prior to freezing and freezing of the mineral and gas free water under quiescent conditions.

I claim:

1. A process of raw water ice manufacture comprising subjecting the raw water in sequence to contact with hydrogen exchange material, contact with anion exchange material, and vacuum degasification in the cold, thereby providing a substantially mineral and gas free water, and freezing said substantially mineral and gas free water under quiescent conditions into solid blocks of clear ice.

2. In a process of making clear raw water ice the steps of passing the raw water through hydrogen exchange material capable of converting salts in solution in the water to the corresponding free acids, then passing the water through an anion exchange material capable of removing the acids, silica and carbon dioxide, then subjecting the water to vacuum deaeration in the cold and thereafter quiescently freezing the water in mineral and gas free condition.

3. The method of claim 1, wherein said anion exchange material is highly basic and removes also carbon dioxide.

4. A process of making clear ice from raw water containing metal salts in solution comprising passing the raw water sequentially through a cation exchange material operating on the hydrogen cycle, through an acid removal material and through a vacuum deaerator in the cold, and then freezing the mineral free and air free water under quiescent conditions and at a temperature within the range of from about 6° F. to about 10° F.

5. A process of making raw water ice comprising the steps of treating the raw water with a hydrogen ion exchange material and thereafter with an anion exchange material, then degasifying the water in the cold, introducing the degasified water into a freezing zone in such manner as to discourage pick-up of air, and quiescently freezing the water at a low temperature.

6. A process of making raw water ice comprising removing from the raw water prior to freezing dissolved mineral salts and gases by subjecting the water to ion exchange and degasifying treatment in the cold, said ion exchange treatment including treatment with a hydrogen ion exchange material and with an anion exchange material, and freezing mineral and gas free water under quiescent conditions.

7. In a process of making clear, non-cracking ice from raw water containing impurities in suspension and solution which includes treating the raw water with a precipitating reagent to precipitate precipitatable impurities contained in the water and separating precipitated solids and suspended solids initially contained in the raw water from the water, the improvement which comprises removing from the thus treated water prior to starting of the freezing process non-precipitatable dissolved mineral salts and gases by subjecting the water to hydrogen ion exchange, to anion exchange and to vacuum deaeration in the cold, and then freezing mineral and gas free water under quiescent conditions into solid blocks of clear ice.

8. In a process of making clear non-cracking ice from raw water containing organic and inorganic impurities in suspension and solution which includes the steps of treating the raw water with lime and a coagulant to precipitate precipitatable impurities, and filtering the water to remove the solids precipitated in the treatment and those initially contained in suspension in the water, the improvement which comprises removing from the filtered water prior to starting of the freezing process mineral salts in solution and carbon dioxide by ion exchange treatment, then degasifying the water by vacuum deaeration in the cold, and then freezing the mineral and gas free water into solid blocks of ice under quiescent conditions and without further addition of water.

9. In a process of making clear raw water ice which includes treating the raw water with a coagulant, and removing the coagulate from the water, the improvement which comprises contacting the thus treated water with a hydrogen exchange material and with an anion exchange material, then subjecting the water to vacuum degasification in the cold, introducing the water into the ice cans in a manner to prevent entraining of air, and freezing the water under quiescent conditions to ice without removing or adding water during the freezing process.

10. In a process of making raw water ice the steps of subjecting the water to vacuum deaeration in the cold, then contacting the deaerated water with a hydrogen exchange material and with an anion exchange material and then quiescently freezing the water in substantially gas and and mineral free condition.

11. A process of manufacturing raw water ice from an alkaline raw water containing metal salts in solution comprising the steps of contacting said water with hydrogen exchange material, then subjecting the water to aeration to remove carbon dioxide therefrom, contacting the aerated water with an anion exchange material, then degasifying the water by vacuum deaeration, and thereafter quiescently freezing the water in substantially demineralized and gas free condition.

ARTHUR CHARLES EMBSHOFF.

REFERENCES CITED

The following references are of record in the file of this patent:

UNITED STATES PATENTS

| Number | Name | Date |
|---|---|---|
| 460,028 | Quisenberry | Sept. 22, 1891 |
| 2,208,173 | Urbain | July 16, 1940 |

OTHER REFERENCES

Article: "Application of Carbonaceous Zeolites to Water Softening" by S. B. Applebaum. Pub. in the "Journal of the Amer'n Water Works Asso.," 1938, vol. 30, pp. 947–78. At pp. 960–61 see "3) Raw water ice manufacture." (Copy in U. S. Patent Office Library.)

Text: "Principles of Refrigeration" by W. H. Motz, 3rd ed. 1947, Nickerson & Collins Co., Chicago, Ill. (pp. 414 and 421). (Copy in Div. 30, U. S. Patent Office.)